(12) United States Patent
Leisenheimer et al.

(10) Patent No.: US 11,762,799 B2
(45) Date of Patent: Sep. 19, 2023

(54) WATCHDOG FOR ADDRESSING DEADLOCKED STATES

(71) Applicant: Infineon Technologies AG, Neubiberg (DE)

(72) Inventors: Stephan Leisenheimer, Deisenhofen (DE); Christof Bodner, Villach (AT); Benjamin Kollmitzer, Pörtschach (AT); Richard Heinz, Munich (DE)

(73) Assignee: Infineon Technologies AG, Neubiberg (DE)

( * ) Notice: Subject to any disclaimer, the term of this patent is extended or adjusted under 35 U.S.C. 154(b) by 312 days.

(21) Appl. No.: 16/547,174

(22) Filed: Aug. 21, 2019

(65) Prior Publication Data

US 2021/0056064 A1    Feb. 25, 2021

(51) Int. Cl.
| G06F 13/00 | (2006.01) |
| G06F 13/40 | (2006.01) |
| G06F 13/16 | (2006.01) |
| G06F 13/42 | (2006.01) |
| G06F 11/07 | (2006.01) |

(52) U.S. Cl.
CPC ...... *G06F 13/4036* (2013.01); *G06F 11/0757* (2013.01); *G06F 13/1694* (2013.01); *G06F 13/4291* (2013.01)

(58) Field of Classification Search
None
See application file for complete search history.

(56) References Cited

U.S. PATENT DOCUMENTS

| 2003/0179531 | A1* | 9/2003 | Yamaguchi | H04L 67/02 361/115 |
| 2006/0242348 | A1* | 10/2006 | Humphrey | G06F 13/4291 710/305 |
| 2007/0296377 | A1* | 12/2007 | Hashimoto | H02J 7/00 320/159 |
| 2008/0018486 | A1* | 1/2008 | Terasawa | G06F 13/4291 340/636.1 |
| 2011/0222898 | A1* | 9/2011 | Kidaka | G03G 15/0258 399/97 |
| 2013/0194836 | A1* | 8/2013 | Morris | H02M 1/32 363/21.14 |

FOREIGN PATENT DOCUMENTS

| EP | 1607864 A2 | 12/2005 |
| WO | 9637816 A2 | 11/1996 |
| WO | 0210933 A1 | 2/2002 |
| WO | 2017183482 A1 | 10/2017 |

OTHER PUBLICATIONS

U.S. Appl. No. 16/412,055, filed May 14, 2019.

* cited by examiner

*Primary Examiner* — Henry Tsai
*Assistant Examiner* — Dean Phan
(74) *Attorney, Agent, or Firm* — Banner & Witcoff Ltd.

(57) ABSTRACT

The described techniques address deadlocking issues associated with interconnected hardware devices that share bus lines associated with a digital communication interface. A watchdog-based solution is described that may be implemented internally within the interconnected hardware devices or, alternatively, as an external component. The watchdog circuity may monitor a logic state of one or more internal connections of a hardware device and cause one or more portions of the hardware device to reset when a deadlock condition is detected using this internal monitoring.

22 Claims, 7 Drawing Sheets

WATCHDOG FOR ADDRESSING DEADLOCKED STATES

TECHNICAL FIELD

Aspects described herein generally relate to addressing hardware deadlocked states and, more particularly, to addressing deadlocked states using watchdog circuitry.

BACKGROUND

Hardware systems often use components that are interconnected with a common set of bus lines. In such systems, the various hardware components may share access to these bus lines in a time-multiplexed manner, with the hardware devices asserting shared bus lines at different times based upon the required communication timing. Thus, in the event that one of the interconnected malfunctions, the state of the shared bus line may become "deadlocked" in the same logic state. A deadlocked state may prevent other interconnected devices from asserting the bus line until the deadlocked issue is resolved. Current solutions to resolve such deadlocking issues are inadequate.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The example aspects of the present disclosure will be described with reference to the accompanying drawings. The drawing in which an element first appears is typically indicated by the leftmost digit(s) in the corresponding reference number.

SUMMARY

Figure 1:
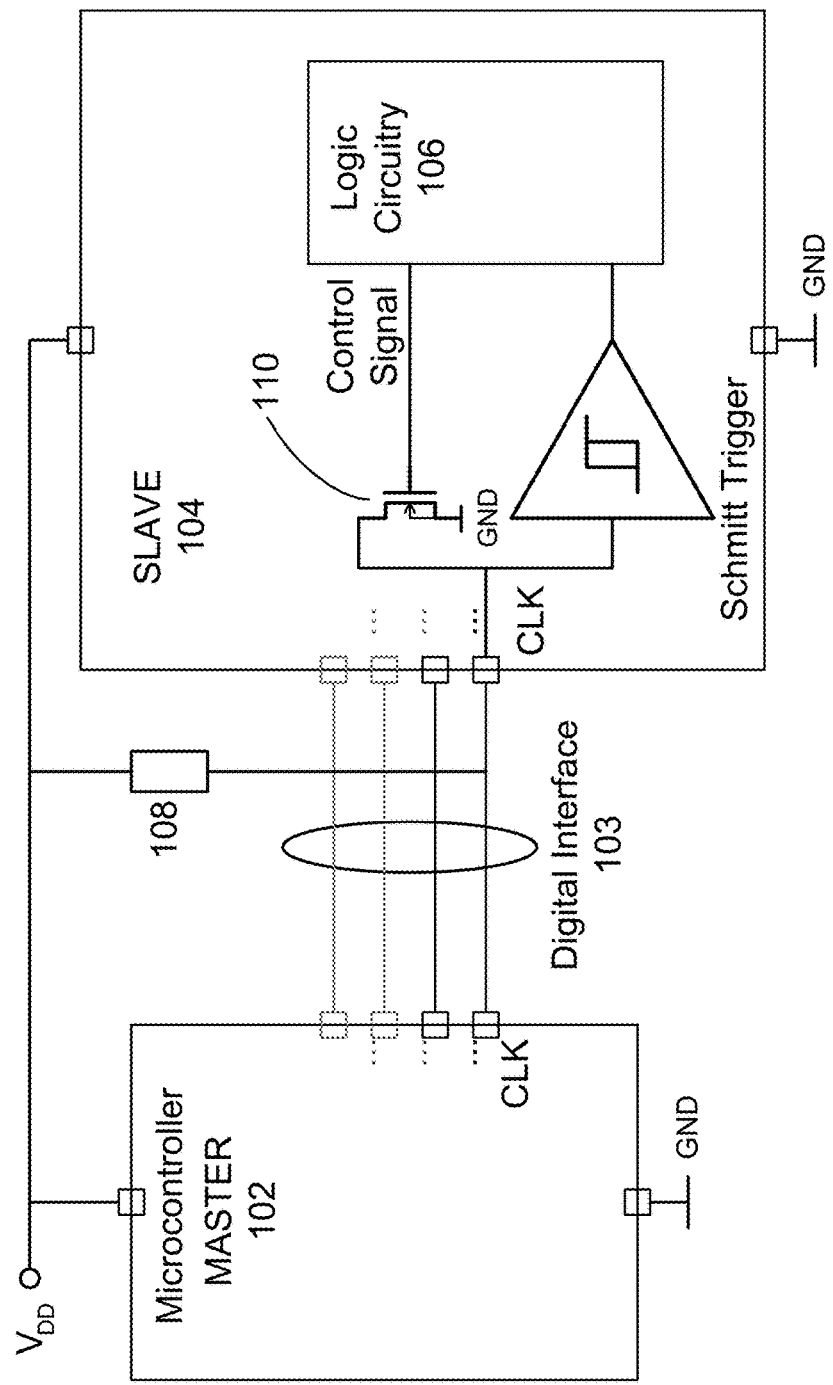
FIG. 1 illustrates a conventional system including a master device and a slave device communicating via a digital interface.

Modern hardware designs often implement interconnected devices that are coupled to and share access with various bus lines, which may include data bus lines and clock bus lines. These bus lines may form, for example, part of the digital communications interface that enable the interconnected hardware devices to communicate with one another and/or with other external components. Such interconnected designs are prone to deadlocking issues and, as the number of interconnected devices increases, the risk of suffering a deadlocking issue also increases. In other words, a malfunction in any one of the interconnected hardware devices may result in one or more bus lines being stuck at the same logic state, and thus unusable by the other hardware components.

Conventional solutions to address deadlocking include resetting the malfunctioning hardware device by toggling its supply voltage, which generates an internal reset and restores the logic of the deadlocked bus line to a default or pre-deadlocked logic state. However, such solutions are expensive, as this requires an external supply voltage switch as well as other additional components dedicated for this purpose. Such solutions also introduce additional design complexities, as software-based components are also required to ensure that the malfunctioning hardware device is properly identified and properly reset.

Thus, the embodiments described herein address the deadlocking issues using a watchdog-based solution. As explained in further detail below, this may include the use of watchdog circuity that is integrated as part of the same chip as a monitored hardware device or external to the monitored hardware device. Moreover, the watchdog circuitry may monitor a logic state of one or more internal connections of the hardware device, in contrast to conventional techniques that monitor the shared external bus lines.

The embodiments described herein advantageously do not require additional components or design efforts as noted above to solve deadlock scenarios. And because it is not required for the watchdog circuitry to monitor the external bus lines, the watchdog timing may be designed independently from the bus line timings, and may instead be dependent only on the timing of the monitored hardware device. These internal hardware device timings are, as a design matter, simpler to determine for the purpose of issuing a hardware component reset. Furthermore, the use of the internal device timing may advantageously enable the watchdog circuitry to be implemented using a different oscillator and/or power supply than other portions of the monitored hardware device. Doing so may further increase the robustness of the watchdog circuitry and thus enable the watchdog circuitry to still reset the malfunctioning monitored hardware device (or portions thereof) in the event of a deadlocking issue caused by such clock or power failures.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

FIG. 1 illustrates a conventional system including a master device and a slave device communicating via a digital interface. As shown in FIG. 1, the conventional system 100 includes a microcontroller that functions as a master device 102, and a slave device 104 that is coupled to the master device 102 via the digital interface 103. The digital interface 103 may function to facilitate bi-directional digital communications between the master device 102 and the slave device 104 to synchronize communications between the master device 102 and the slave device 104. Thus, the digital interface 103 may implement several bus lines as shown in FIG. 1, with one of these bus lines being a clock (CLK) line. When communicating with one another, the master device 102 and the slave device 104 may each assert the CLK line at different times.

As shown in FIG. 1, the slave device 104 may include logic circuitry 106 configured to perform processing and communication operations for the slave device 104, a Schmitt trigger for debouncing the CLK signals received via the CLK line, and a transistor 110 that is coupled to the CLK line. The gate of the transistor 110 is also connected to a control line of the logic circuitry 106 and receives control signals via this control line. Thus, the CLK line is ordinarily pulled up to the supply voltage $V_{DD}$ via the pull-up resistor 108 and, when the slave device 104 asserts the CLK line (e.g., when transmitting data to the master device 102), the logic circuitry 106 may assert the control line by outputting a control signal having the appropriate logic at the gate of transistor 110 such that the transistor 110 conducts, and the CLK line is pulled to ground (GND). In this way, logic circuitry 106 may modulate the CLK line as needed via the switching of the transistor 110. However, in the event of a malfunction of the slave device 104, the control signal may become fixed in the asserted logic high state, which results in the CLK line being stuck, or deadlocked, at a low logic state. In this deadlocked state, the master device 102 (as well as any other devices connected to the CLK line) can no longer utilize the CLK line.

Figure 2:
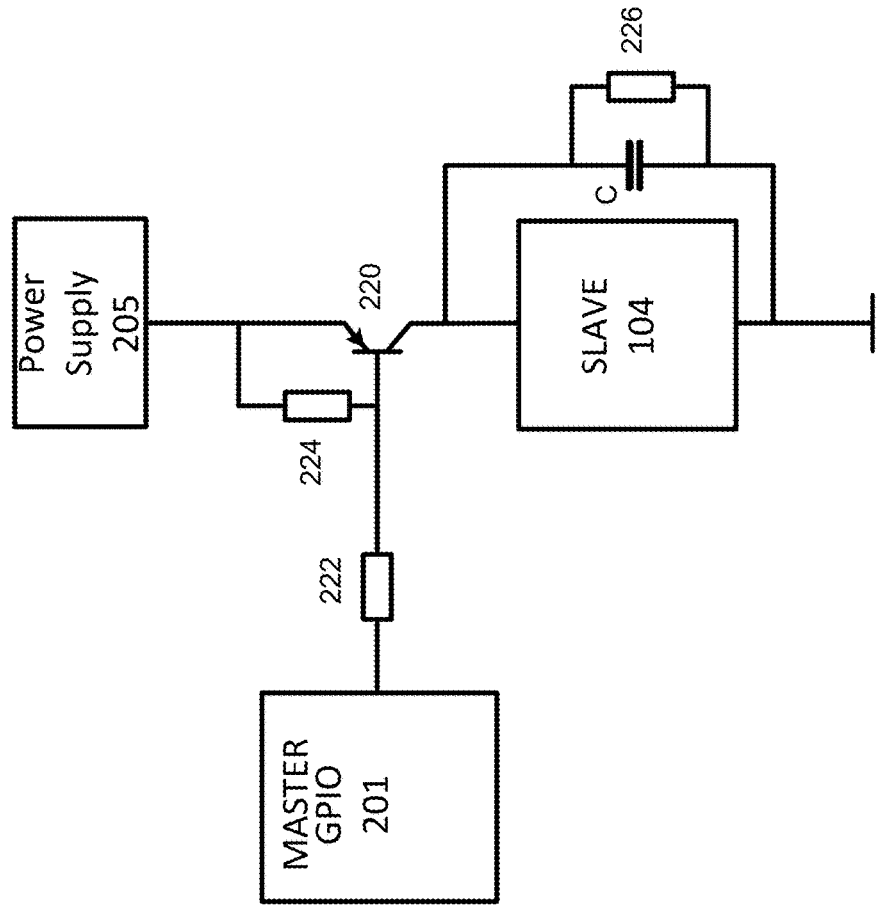
FIG. 2 illustrates a conventional reset circuit for addressing bus line deadlocking.

To remedy the deadlocking state, conventional solutions include using an additional reset circuit, which is shown in FIG. 2 as being coupled to the slave device 102 as shown in FIG. 1. The reset circuit 200 as shown in FIG. 2 includes a master general purpose input/output (GPIO) device 201 and an external power supply 205, which are coupled to the slave device 104 via a voltage switch configuration that includes a transistor 220, resistors 222, 224, 226, and a capacitor C. This conventional solution functions to monitor the CLK line and toggles the supply voltage $V_{DD}$ of the slave device 104, which generates an internal reset in the slave device 104 to solve the deadlock described with respect to FIG. 1. But again, this conventional solution of external and dedicated reset switching adds significant cost to the system design, and also requires additional design effort to be expended with regards to the implementation of these additional components, solder points, PCB layout and space, and the design of the software executed by the master GPIO 201. Further complicating this issue, in cases in which the slave device 104 consumes extremely low currents from the supply line, an additional pull-down transistor is needed to discharge the supply voltage pin of the slave device 104 within a reasonable time.

As further discussed below, the embodiments presented in this disclosure obviate the need for external and dedicated reset circuits, and instead aim to solve deadlocking by monitoring control signals generated by the potentially malfunctioning device itself.

Figure 3:
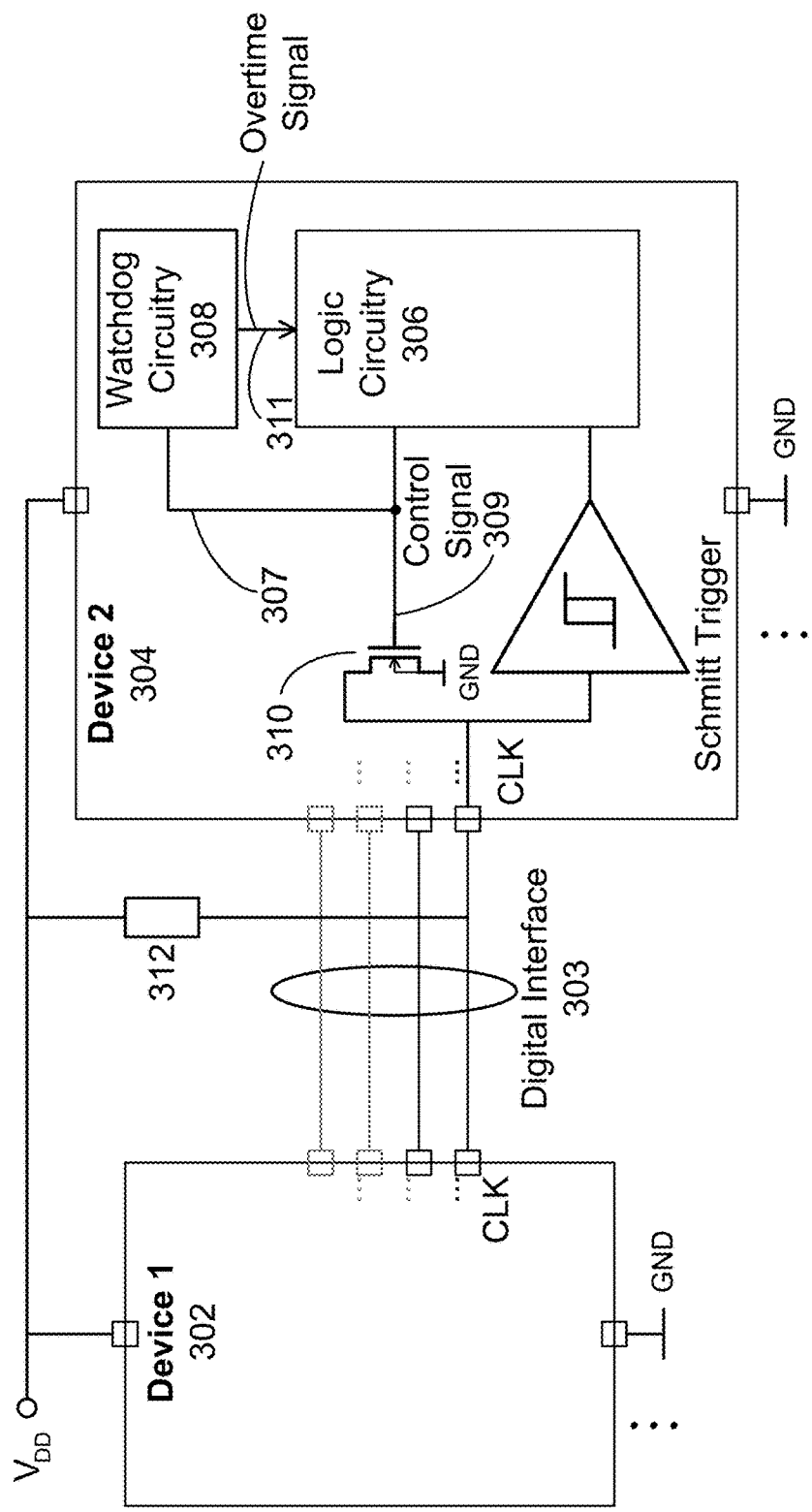
FIG. 3 illustrates a system including a first device and a second device communicating with one another via a digital interface, in accordance with an embodiment of the disclosure.

FIG. 3 illustrates a system including a first device and a second device communicating with one another via a digital interface, in accordance with an embodiment of the disclosure. The system 300 is shown in FIG. 3 as including a first device 302 and a second device 304 for ease of explanation and not by way of limitation. Embodiments include the system 300 implementing any suitable number of first devices 302 and/or second devices 304, which may be interconnected via one or more bus lines included in the digital interface 303.

For convenience, the embodiments are described herein with reference to the first device 302 and the second device 304 in the singular. However, the embodiments described herein with reference to the second device 304 may be extended to any number of interconnected devices within the system 300. For example, the embodiments described herein with reference to the watchdog circuitry of the second device 304 may additionally or alternatively be implemented as part of the first device 302. As another example, the embodiments described herein with reference to the watchdog circuitry of the second device 304 may additionally or alternatively be implemented as part of additional devices configured in a similar manner as the second device 304, which may be configured to additionally communicate with the first device 302.

Furthermore, although the embodiments discussed herein are with respect to the monitoring of a CLK line, deadlocked states are not exclusive to clock line types, and other bus lines may be deadlocked as well in the event of a malfunction of a hardware device. Thus, the embodiments described herein should not be interpreted as being applicable only to prevent deadlocked states of CLK lines. Instead, the concepts described herein may be expanded to include the internal monitoring of any suitable type of logic signal that affects the logic state of an external bus line that may be shared by other interconnected hardware devices within a system. This may include, for example, monitoring internal logic signals that result in the assertion of data bus lines, and causing one or more portions of a device to be reset when the monitored signal remains at the same logic state that results in a deadlocked external bus line. The embodiments described herein may include monitoring deadlocked states of other bus lines in addition to or as an alternative to the monitoring of CLK lines. For instance, the second device 304 may include watchdog circuitry 308 and appropriate connections to the logic circuitry 306 to monitor the logic state of one or more other signals used by the logic circuitry 306 that control the state of one or more (or all) of the bus lines included in the digital interface 303. Thus, embodiments include any number of interconnected devices within the system 300 implementing the watchdog techniques as described herein to prevent deadlocking issues with any number of bus lines included in the digital interface 303.

In an embodiment, the first device 302 and the second device 304 may be implemented as any suitable type of device configured to communicate with one another bi-directionally using the digital interface 303. These communications may occur in accordance with any suitable type of communication protocol that facilitates the first device 302 and the second device 304 establishing a connection with one another to exchange data. Some examples of suitable communication protocols may include the Inter-Integrated Circuit (I2C) protocol, the Serial Peripheral Interface (SPI) protocol, the Controller Area Network (CAN) protocol, the 1-Wire protocol, etc. Thus, the digital interface 303 may include any suitable number of bus lines to facilitate the particular type of communication protocol that is implemented for a particular application.

In an embodiment, the first device 302 and the second device 304 may both utilize one or more bus lines in the digital interface 303 to communicate with one another as part of a master/slave relationship, as discussed herein with reference to FIG. 1. In such a case, the first device 302 may be implemented as any suitable type of master device such as a microcontroller, for example. The second device 304 may be implemented as any suitable type of slave device, such as, for example, another microcontroller, a sensor device configured to measure a physical property, an analog-to-digital converter, etc.

To facilitate bidirectional communications, each of the first device 302 and the second device 304 may assert the CLK line (as well as one or more data lines not shown in FIG. 3) when transmitting data to the other device in accordance with a specific communication protocol. To avoid bus contention, the first device 302 and the second device 304 may each utilize the CLK line to send a signal to the other device indicating that the sending device will be driving the bus line such that the receiving device does not attempt to do so within a future time window that may be established by a communication protocol.

The second device 304 may include a Schmitt trigger or other suitable device to debounce the CLK signals received from the first device 302. The logic circuitry 306 may include any suitable configuration of hardware to facilitate the second device 304 processing data, transmitting data to the first device 302, and receiving data from the first device 302. The logic circuitry may be integrated as part of the same chip (i.e., die) as the second device 304 such that the logic circuitry 306 is internal to the second device 304. The logic circuitry 306 may manage data handling and timing functions for the second device 304, and may be implemented, for instance, as a sub-circuit of the second device 304. As an example, the logic circuitry 306 may be implemented as a system-on-chip (SoC) having suitable complementary metal oxide semiconductor (CMOS) circuitry to enable data processing and communication functions associated with the second device 304.

Furthermore, the second device 304 may include any suitable type of driver configuration coupled to the logic circuitry 306 and to the CLK line to enable the second device 304 to control the logic state of the CLK line when the second device 304 needs to assert the CLK line for communications with the first device 302. For example, the second device 304 may include transistor 310 coupled to the logic circuitry 306 and to the CLK line in an open-drain configuration. In such a configuration, the transistor 301 may have a gate terminal coupled to the logic circuitry 306 via the control line 309, as shown in FIG. 3. The logic circuitry 306 may have an output terminal that is also coupled to the control line 309, and the logic circuitry 306 may be configured to output the control signal on the control line 309. In an embodiment, the control signal may be an interrupt signal or another suitable signal that signals other interconnected devices (e.g., the first device 302) about the occurrence of particular events depending upon the particular implementation of the second device 302. For example, the interrupt signal may indicate to the first device 302 that there are new measurement results or that new data is available for the first device 302 to fetch (e.g., read out of a memory of the second device 304 or another suitable device).

As another example, the control signal may alternatively be a "clock stretching" signal that is used in accordance with various data communication protocols, such as I2C, for example. Continuing this example, the second device 304 may use the control signal as a clock stretching signal to delay ongoing communications with the first device 302 via the digital interface 303. This may be applicable in various scenarios, one example being when the first device 302 has not yet finished a requested operation (e.g., a sensor data measurement), and the new data are not yet ready to be read-out.

In other words, the control signal may be used as a clock stretching signal in accordance with a communication protocol to prevent the first device 302 from communicating excessively fast with the second device 304. Said another way, the use of a clock stretching signal may prevent the first device 302 from communicating with the second device 304 in accordance with a threshold communication rate, which may be a predetermined communication rate, a proportion of the communication rate used in accordance with a particular communications protocol, a communication rate that is adjusted from an original or default communication rate, etc. This threshold communication rate may include aperiodic and periodic communications rates, with aperiodic communication rates including the aforementioned waiting periods associated with the completion of particular events by the first device 302.

The transistor 310 may further have a drain terminal coupled to the CLK line, which is pulled up to the supply voltage $V_{DD}$ via the resistor 312, and the source terminal of the transistor 308 may be coupled to a ground reference. Thus, in this open-drain configuration, the CLK line may be pulled high (to a logic high state) via the resistor 312 when the transistor 310 is non-conductive. The CLK line may be driven to a logic low state (GND) when the transistor 308 is conductive, which may occur when the control signal is asserted to a logic high by the logic circuitry 306 in the configuration shown in FIG. 3.

Although illustrated as an n-type field effect transistor (FET) in FIG. 3, embodiments include the second device 304 implementing any suitable type of transistor 310. Examples of such transistors may include, for instance, a bipolar junction transistor (BJT), a heterojunction bipolar transistor (HBT), etc. Moreover, the example driver configuration as shown in FIG. 3 implementing the single transistor 310 is but one example of a driver configuration that may be used by the second device 304 to assert the CLK line. Although not shown in FIG. 3 for purposes of brevity, another example of a driver stage may alternatively implement a push-pull output transistor configuration with tristate. For example, the transistor 310 as shown in FIG. 3 may be replaced with any suitable configuration of transistors to enable the CLK line to be driven to either a logic high or a logic low state in accordance with an output of the push-pull transistor configuration, which is provided in response to the control signal output by the logic circuitry 306.

In any event, embodiments include the second device 304 asserting the CLK signal in response to the control signal output by the logic circuitry 306. Again, in the event of a malfunction of the logic circuitry 306, the control line may continue to be asserted and cause a deadlocked state of the CLK line. Thus, to avoid these deadlocking issues, embodiments include the second device 304 implementing watchdog circuitry 308, which may monitor the internal control signal provided by the logic circuitry 306. In the event that the control signal remains in a particular logic state (e.g., logic high in this example) in excess of a watchdog timeout threshold, the watchdog circuitry 308 may cause one or more portions of the second device 304 to reset to resolve the deadlocked state by causing the control signal to revert back to a default, or pre-asserted state (logic low in this example).

To do so, embodiments include the watchdog circuitry 308 being coupled to the logic circuitry 306 via a monitoring line 307 and an overtime line 311, as shown in FIG. 3. The monitoring line 307 may be coupled directly to the logic circuitry 306, directly to the transistor 310, or in any suitable manner such that the watchdog circuitry 308 may accurately monitor the logic state of the control signal provided to the transistor 310 (or other suitable driver configuration, as the case may be). For example, the monitoring line 307 may include additional buffers, couplers, etc., to provide isolation between the watchdog circuitry 308 and other components of the second device 304 if desired. Similarly, the watchdog circuitry 308 may be coupled to the logic circuitry 306 directly or indirectly (e.g., with buffers, drivers, etc.) via the overtime line 311.

The watchdog circuitry 308 may be configured as an integrated part of the second device 304, and may be formed as part of the same chip (i.e., die) as the second device 304 together with the other components of the second device 304 such as the transistor 310, the logic circuitry 306, etc. The watchdog circuitry 308 may be internal to the second device 304 when implemented on the same die, although embodiments are not limited to this specific implementation. Instead, alternate embodiments include the watchdog circuitry 308 being implemented as one or more components that are coupled to the logic circuitry 306 in any suitable manner to monitor the logic state of the control signal and to cause one or more portions of the second device 304 to reset when a deadlocked state is detected.

The watchdog circuitry 308 may be implemented in accordance with any suitable type of architecture that outputs an overtime signal to the logic circuitry 306 based upon the monitored state of the control signal. The examples of the watchdog circuitry 308 described herein are with reference to a timeout watchdog architecture, although the embodiments are not limited to these examples. For example, the watchdog circuitry 308 may alternatively be implemented as another type of watchdog architecture, such as a multi-stage watchdog architecture that triggers the generation of the overtime signal after several periods of time have expired.

In other words, in the examples described in further detail below, the watchdog circuitry 308 is described as generating the overtime signal once the control signal remains at a particular logic state in excess of a watchdog timeout threshold. In accordance with such embodiments, the overtime signal may be generated immediately upon the watchdog timeout threshold condition being satisfied, excepting for other system delays such as response time of circuit components or overall system latency. However, the embodiments are not limited to this particular example, and the overtime signal may be generated in accordance with any suitable time schedule once the deadlocking condition is detected (i.e., once the watchdog timeout threshold is exceeded). For example, the overtime signal may be generated with a fixed or adjustable delay regarding when the overtime signal is output to the logic circuitry 306 once it is determined that the control signal has remained at a particular logic state in excess of a watchdog timeout threshold.

As discussed above with respect to the generation of the overtime signal, the watchdog circuitry 308 may be implemented in accordance with various architectures, and thus the watchdog counter may be started immediately upon the watchdog circuitry 308 detecting the change in the logic state of the control signal output by the logic circuitry 306, excepting for other system delays such as response time of the watchdog circuitry 308 and other system latency. Alternatively, the watchdog circuitry 308 may delay starting the watchdog counter by a time period that may be fixed or adjustable. Furthermore, the watchdog timeout threshold itself may be fixed or adjustable, and may be configured based upon the specific application in which the watchdog circuitry 308 is implemented. For instance, the watchdog timeout threshold may be established (fixed or adjusted) based upon the clock speed used by the digital interface 300 or other suitable parameters.

Additionally, the watchdog circuitry 308 may be implemented internally to the second device 304 and/or as an external component. In various embodiments, the watchdog circuitry 308 may also use one or more dedicated components that are different than those used by the second device 304. For example, the watchdog circuitry 308 may implement a different oscillator, logic, and/or supply voltage $V_{DD}$ than that implemented by the second device 304 or other devices within the system 300. For instance, these different components may be dedicated for the watchdog circuitry 308 or shared with components within the system 300 other than the second device 304 (e.g., shared among each watchdog circuitry within the system 300). In this way, the embodiments described herein ensure robust operation of the watchdog circuitry 308, as malfunctions of the second device 304 caused by the oscillator, voltage supply, logic, etc., will not impact the watchdog circuitry 308. Thus, the watchdog circuitry 308 may continue to monitor the state of the control signal and generate overtime signals in the event of such malfunctions.

Figure 4A:
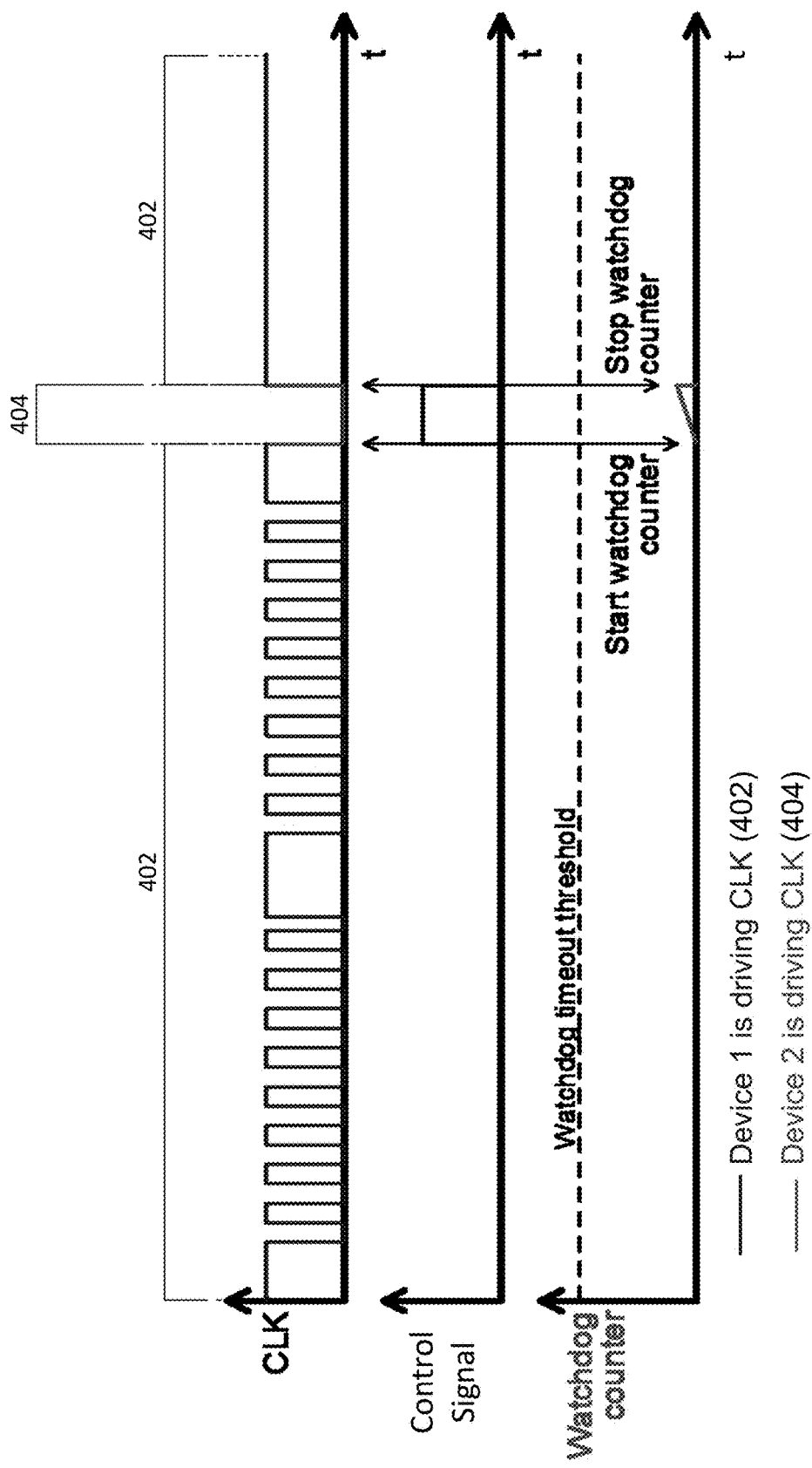
FIG. 4A illustrates timing diagrams in which an internal control line associated with a device remains at the same logic state for a duration that is less than a watchdog timeout threshold, in accordance with an embodiment of the disclosure.

Again, as shown in FIG. 3, the watchdog circuitry 308 monitors the logic state of the control line 309 that is used by the logic circuitry 306 to output the control signal. This is accomplished via the monitoring line 307, which is coupled the watchdog circuitry 308 to the control line 309. Turning now to FIG. 4A, the monitoring functionality of the watchdog circuitry 308 is explained in further detail. With continued reference to FIG. 3, FIG. 4A illustrates a timing diagram for the CLK signal carried via the CLK line of the digital interface 303, the control signal carried via the control line 309, and the watchdog counter timing implemented by the watchdog circuitry 308. Each of these timing diagrams 400 is shown on the time scale. As shown in FIG. 4A, the first device 302 is driving the CLK line for time periods 402, whereas the second device 304 is driving the CLK line during the time period 404.

To drive the CLK line, the logic circuitry 306 outputs the control signal having a logic high state in this example, which turns on the transistor 310 and causes the CLK signal to change from a logic high state to a logic low state as shown during the time period 404. In an embodiment, the watchdog circuitry 308 detects the change in the logic state of the control line 309 via the monitoring line 307, which may be detected in accordance with edge-sensitive logic (e.g., detecting the rising edge of the control signal) or level-sensitive logic (e.g., detecting that the control signal is now at a logic state different than a default state). In any event, upon detecting the change in the logic state of the control signal output by the logic circuitry 306, embodiments include the watchdog circuitry 308 starting a counter (e.g., a timer) that will continue to run until a subsequent change in the logic state of the control signal is detected (which may also be via edge-sensitive or level-sensitive logic).

As shown in FIG. 4A, the control signal returns to the previous logic low state at the end of the time period 404, relinquishing control of the CLK line. As a result, the watchdog counter implemented via the watchdog circuitry 308 is stopped and reset (i.e., "kicked") at the end of the time period 404. In this example, there is no deadlocking state that occurs, and the time period 404 is shown as being less than watchdog timeout threshold period. The operation of the system 300 thus continues, with the watchdog counter being started and reset as applicable in this fashion as the watchdog circuitry 308 continues to monitor the control signal output by the logic circuitry 306 via the monitoring line 307.

Figure 4B:
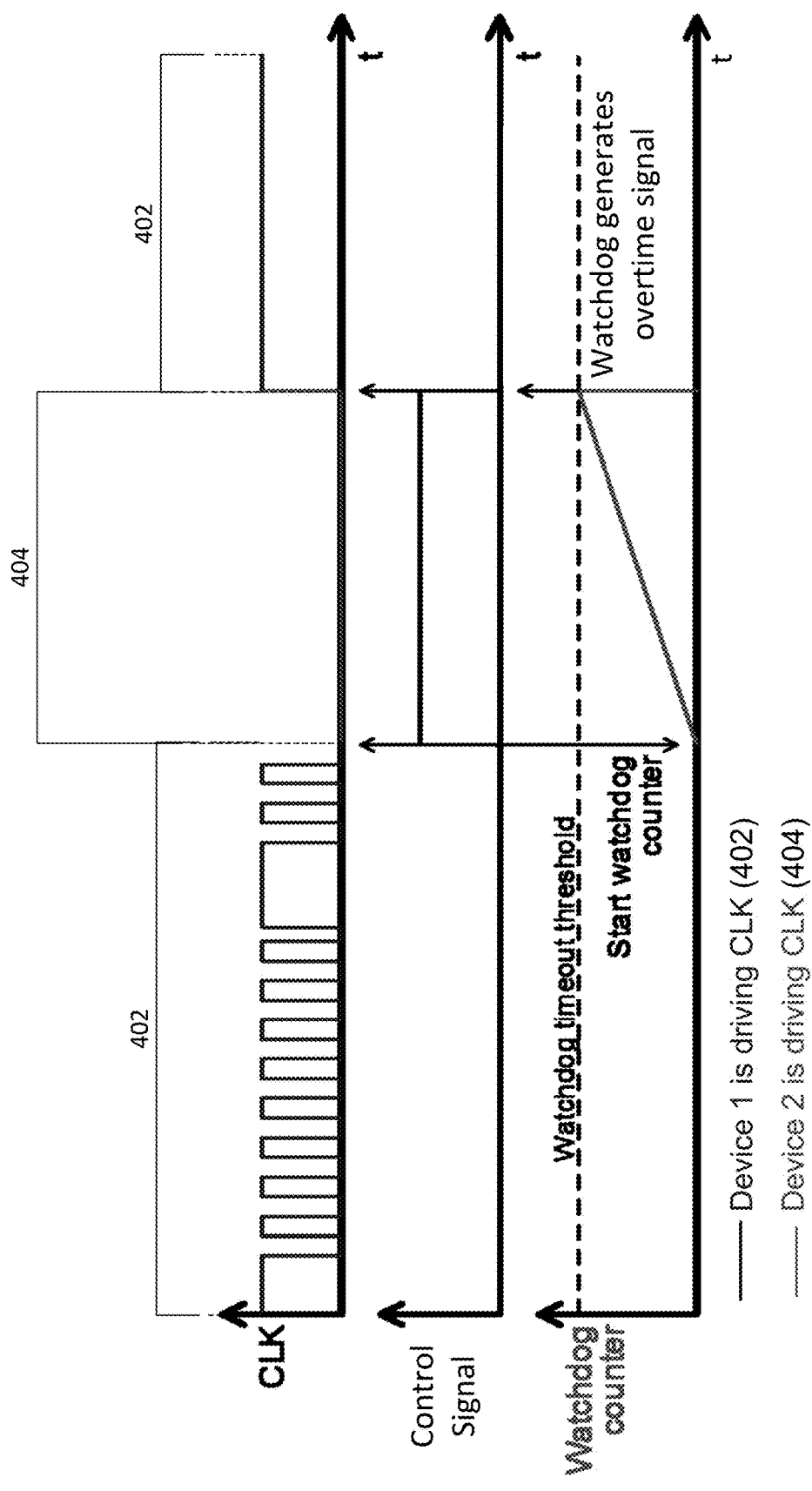
FIG. 4B illustrates timing diagrams in which an internal control line associated with a device remains at the same logic state for a duration that exceeds a watchdog timeout threshold, in accordance with an embodiment of the disclosure.

FIG. 4B illustrates the same timing diagrams as shown in FIG. 4A, with continued reference to FIG. 3. Like the timing diagrams 400 shown in FIG. 4A, the timing diagrams 425 as shown in FIG. 4B also represent the first device 302 driving the CLK line for time periods 402, and the second device 304 driving the CLK line during the time period 404. However, in the example timing diagrams 425 shown in FIG. 4B, the second device 304 malfunctions and causes the CLK line to be in a deadlocked state. As shown in FIG. 4B, the watchdog circuitry 308 initiates the watchdog counter upon detecting a change in the logic state of the control signal from a logic low state to a logic high state, which results in the CLK line being driven to a logic low state.

In the example timing diagrams 425 as shown in FIG. 4B, the control signal remains in the logic high state, thus asserting the CLK line low for the time period 404. In this example, the time period 404 in which the control signal remains in the logic high state exceeds the watchdog timeout threshold as shown. In this example, once the control signal remains at the same logic state in excess of the watchdog timeout threshold, the watchdog circuitry 308 generates the overtime signal, which is coupled to the logic circuitry 306 via the overtime line 311.

The overtime signal generated by the watchdog circuitry 308 may be configured to cause one or more portions of the second device 304 to reset. This may be accomplished, for instance, by resetting the logic circuitry 306 or portions of the logic circuitry 306. As an illustrative example, the overtime signal may cause a partial reset of the second device by causing the logic of the logic circuitry 306 that is associated with the communication interface to be reset, while other parts of the second device 304 maintain their current state. As another example, the overtime signal may be coupled to a suitable terminal of the logic circuitry 306 via the overtime line 311 that causes the logic circuitry 306 to reset, and which may optionally cause other portions of the second device 304 (or the entire second device 304) to reset as well.

The overtime signal may be configured in different ways depending upon the architecture of the watchdog circuitry 308, the implementation of the logic circuitry 306, and the particular implementation of the second device 304. For example, the overtime signal may be generated in the form of a timed pulse, in accordance with a maskable interrupt, a non-maskable interrupt, or combinations of these. The overtime signal may have a format in terms of data and/or logic timing that is fixed or adjustable. In alternate embodiments, the watchdog circuitry 308 may, instead of being directly coupled to the logic circuitry via the overtime line 311, be coupled to another device that is internal or external to the second device 304 (not shown). In such cases, the watchdog circuitry 308 may provide the overtime signal to these other component(s) that may, in turn, generate and provide the requisite reset signal to the logic circuitry 306.

In any event, as stated above, the generation of the overtime signal may cause one or more portions of the second device 304 and/or the logic circuitry 306 to be reset. In an embodiment, upon the reset of the second device 304 and/or the logic circuitry 306, the control signal may revert back to the default, unasserted logic state. For example, as shown in FIG. 4B, upon the watchdog circuitry 308 generating the overtime signal, the reset of the second device 304 and/or the logic circuitry 306 causes the control signal to revert back to the logic low state, thus resolving the deadlocked state and ceding control of the CLK line to the first device 302 (or other devices in the system 300, as the case may be).

Figure 4C:
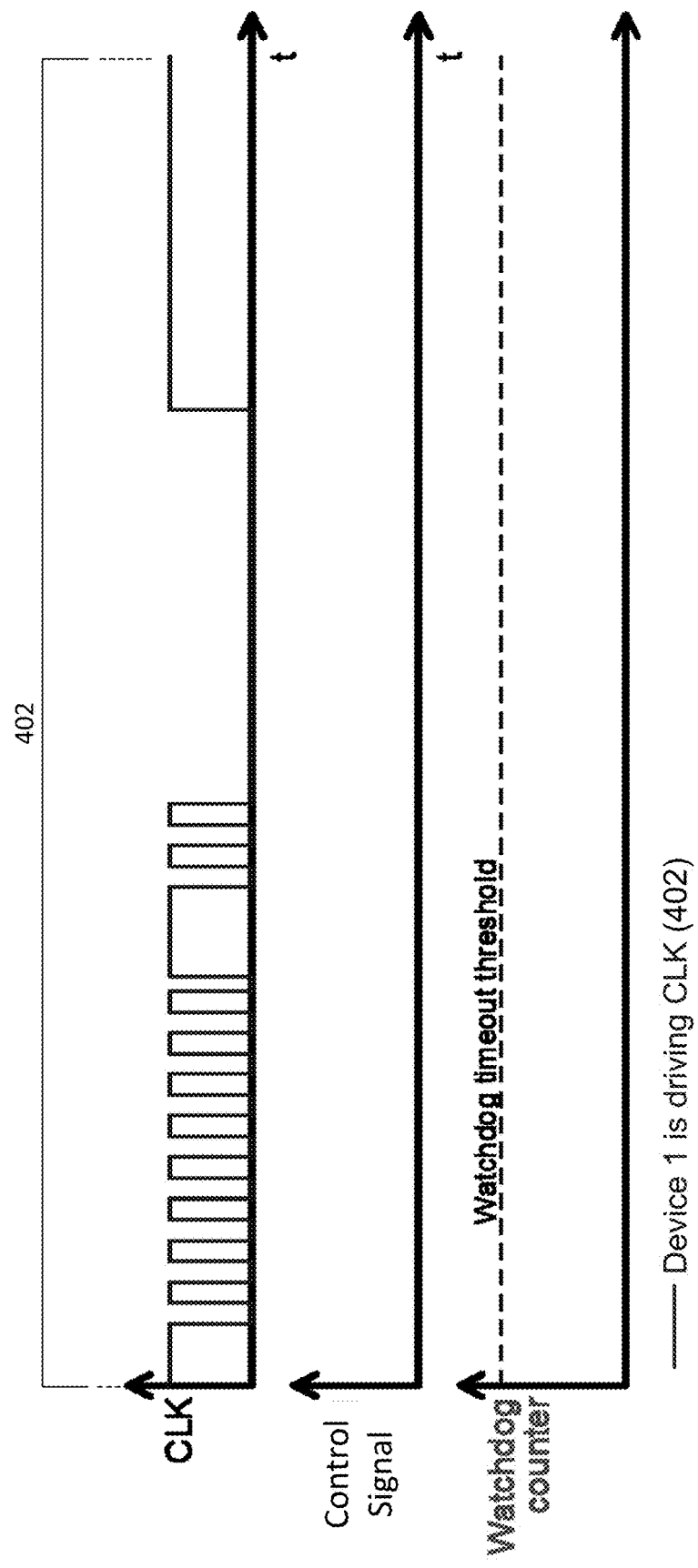
FIG. 4C illustrates timing diagrams in which an internal control line associated with a device is not asserted and a watchdog counter is not started, in accordance with an embodiment of the disclosure.

In an embodiment, the operation of the watchdog circuitry 308 may be transparent to the rest of the system 300 during ordinary operation. For instance, FIG. 4C illustrates the same timing diagrams as shown in FIGS. 4A with continued reference to FIG. 3. Like the timing diagrams 400 shown in FIG. 4A, the timing diagrams 450 as shown in FIG. 4C also represent the CLK signal carried via the CLK line of the digital interface 303, the control signal carried via the control line 309, and the watchdog counter timing implemented by the watchdog circuitry 308. However, unlike the timing diagrams 400, 425 as shown in FIG. 4A, 4B, respectively, the timing diagrams 450 as shown in FIG. 4C indicate that the second device 304 does not assert the CLK line. Instead, the first device 302 exclusively drives the CLK line during the entire time period 402 as shown. As a result, the control signal does not change state from the logic low state, and the watchdog counter is not started.

The logic states described above and elsewhere throughout the disclosure are examples used in accordance with the driver configuration as shown in FIG. 3 implementing the transistor 310 in an open-drain configuration, and other embodiments may use alternate logic states based upon other driver configurations. More generally, embodiments include the watchdog circuitry 308 initiating the watchdog timer based upon detecting a change in the logic state of the control signal from one logic state that is associated with not asserting a particular bus line (e.g., CLK line) to another logic state that is associated with asserting the same bus line.

Figure 5:
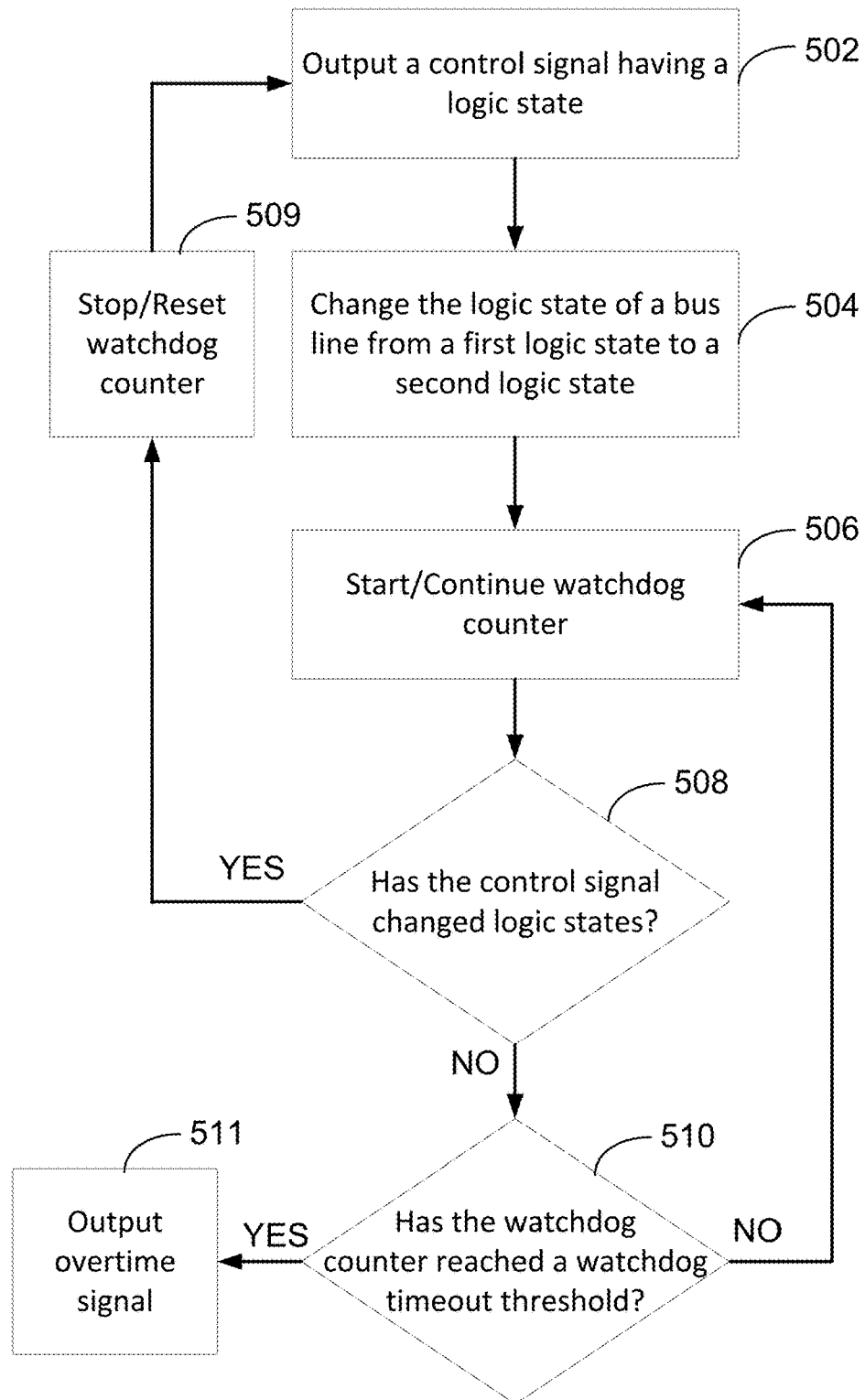
FIG. 5 illustrates a method flow, in accordance with an embodiment of the disclosure.

FIG. 5 illustrates a method flow, in accordance with an embodiment of the disclosure. The method flow 500 may begin when a control signal is output (block 502) having a particular logic state. This may include, for example, the logic circuitry 306 of the second device 304 outputting the control signal at a logic state that indicates the occurrence of a particular event (e.g., as an interrupt signal), or to prevent excessively fast communications from occurring with first device 302 (e.g., as a clock stretching signal). Again, the assertion of the control signal in this manner may in turn assert a particular bus line, such as the CLK line as shown in FIG. 3, for instance.

The method 500 may include the logic state of the control signal deviating from a default state to cause a bus line (e.g., the CLK line as shown in FIG. 3) to change (block 504) logic states such that the bus line is asserted. This may include, for example, the change in the CLK signal as shown in FIG. 4B, which is in response to the control signal being output at a logic high state causing the CLK line to change to a logic low state via the conduction of the transistor 310.

The method 500 may include starting (block 506) a watchdog counter upon the watchdog circuitry detecting a change (block 502) in the logic state of the control signal. This may include, for example, the watchdog circuitry 308 monitoring the output signal via the monitoring line 309 as shown in FIG. 3, and initiating a watchdog counter (e.g., timer) upon detecting the control signal being driven to a particular logic state, as discussed herein with reference to FIG. 4B.

The method 500 may include determining (block 508) whether the control signal has changed logic states or whether the control signal has remained at the same logic state. This may be performed, for example, via the watchdog circuitry 308 as shown in FIG. 3. This determination (block 508) may be repeated, for instance, each time the watchdog counter is incremented or in accordance with any suitable sampling schedule. In the event that the logic state of the control signal has changed (e.g., reverted back to a default logic state or the logic state prior to changing (block 504) the logic state of the bus line) (block 508—YES branch), then the method 500 may include stopping and/or resetting (block 509) the watchdog counter. In the event that the control signal remains at the same logic state, then method 500 continues (block 508—NO branch).

This process of outputting (block 502) a control signal, changing (block 504) the logic state of the bus line in response to the control signal, starting (block 506) the watchdog counter, and determining (block 508) whether the control signal has reverted back to the default logic state may be repeated as shown in FIG. 5 each time the second device 304 outputs another control signal to assert the bus line.

When the control signal remains at the same logic state (block 508—NO branch), the method 500 may include further determining (block 510) whether the watchdog counter has reached a watchdog timeout threshold. If not, then the watchdog counter may continue to run while the control signal remains in the same logic state (block 510—NO branch).

Thus, the process of continuing to increment (block 506) the watchdog counter, determining (block 508) whether the control signal has reverted back to the default logic state, and determining (block 510) whether the watchdog counter has reached a watchdog timeout threshold may be repeated as shown in FIG. 5 as long as the control signal remains at the same logic state until the watchdog counter reaches the watchdog timeout threshold (block 510—YES branch). Upon the watchdog counter reaching the watchdog timeout threshold (block 510—YES branch), the watchdog circuitry 308 may output (block 511) the overtime signal. As discussed herein, the overtime signal may cause one or more portions of the second device 304 to reset, thus resetting logic state of the control signal to its default state and resetting the watchdog counter. After the reset is completed, however, the method 500 may be repeated each time another control signal is output (block 502) to assert the bus line, as discussed herein.

The techniques of this disclosure may also be described in the following examples.

Example 1. A device, comprising: a transistor coupled to a bus line external to the device and to logic circuitry internal to the device, the transistor being configured to change a logic state of the bus line from a first logic state to a second logic state in response to a control signal received from the logic circuitry; and watchdog circuitry internal to the device, the watchdog circuitry being configured to provide an overtime signal to the logic circuitry when the control signal remains at the same logic state in excess of a threshold timeout period.

Example 2. The device of Example 1, wherein the transistor is coupled to the bus line in an open drain configuration or a push-pull configuration.

Example 3. The device of any combination of Examples 1-2, wherein the bus line is a clock line that is connected to the device and to a second device.

Example 4. The device of any combination of Examples 1-3, wherein the clock line is used in accordance with an I2C communication protocol to enable the device and the second device to communicate with one another.

Example 5. The device of any combination of Examples 1-4, wherein the overtime signal provided by the watchdog circuitry causes one or more portions of the device to reset.

Example 6. The device of any combination of Examples 1-5, wherein upon the one or more portions of the device being reset, the control signal changes to a logic state that is different than the same logic state at which the control signal remained in excess of the threshold timeout period.

Example 7. The device of any combination of Examples 1-6, wherein the watchdog circuitry is configured to initiate a timer based on detecting a change in the logic state of the control signal.

Example 8. The device of any combination of Examples 1-7, wherein the watchdog circuitry is configured to operate using at least one of a different oscillator or a different power supply than the logic circuitry.

Example 9. The device of any combination of Examples 1-8, wherein the transistor, the watchdog circuitry, and the logic circuitry are implemented on a same semiconductor chip.

Example 10. The device of any combination of Examples 1-9, wherein the transistor receives the control signal from the logic circuitry via a control line, and wherein the watchdog circuitry is connected to the control line via a monitoring line.

Example 11. A system, comprising: a first device configured to selectively drive a bus line; and a second device coupled to the first device via the bus line, the second device being configured to selectively drive the bus line and including: a transistor coupled to the bus line and to logic circuitry internal to the second device, the transistor being configured to change a logic state of the bus line from a first logic state to a second logic state in response to a control signal received from the logic circuitry indicating that the second device is to drive the bus line; and watchdog circuitry internal to the second device, the watchdog circuitry being configured to monitor a logic state of the control signal, and to provide an overtime signal to the logic circuitry when the control signal remains at the same logic state in excess of a threshold timeout period.

Example 12. The system of Example 11, wherein the first device is a master device, and wherein the second device is a slave device.

Example 13. The system of any combination of Examples 11-12, wherein the control signal is one of (i) an interrupt signal that signals an event to the master device, or (ii) a clock stretching signal that prevents the master device from communicating with the slave device in excess of a threshold communication rate.

Example 14. A method, comprising: changing, via a transistor, a logic state of a bus line from a first logic state to a second logic state in response to a control signal received from a logic circuitry internal to a first device, the transistor being coupled to (i) a bus line external to the first device, and (ii) the logic circuitry; and outputting, via watchdog circuitry internal to the first device, an overtime signal when the control signal remains at the same logic state in excess of a threshold timeout period.

Example 15. The method of Example 14, further comprising: coupling the transistor to the bus line in an open drain configuration or a push-pull configuration.

Example 16. The method of any combination of Examples 14-15, further comprising: coupling the bus line to a second device as a clock line that is coupled to the first device and to the second device.

Example 17. The method of any combination of Examples 14-16, further comprising: asserting, via the logic circuitry, the control signal as one of (i) an interrupt signal when the first device signals an event to the second device, or (ii) a clock stretching signal that prevents the second device from communicating with the first device in excess of a threshold communication rate.

Example 18. The method of any combination of Examples 14-17, wherein the overtime signal provided by the watchdog circuitry causes one or more portions of the first device to reset, thereby changing the control signal to a logic state that is different than the same logic state at which the control signal remained in excess of the threshold timeout period.

Example 19. The method of any combination of Examples 14-18, further comprising: based on detecting a change in the logic state of the control signal, initiating a timer via the watchdog circuitry.

Example 20. The method of any combination of Examples 14-19, further comprising: coupling the watchdog circuitry to at least one of a different oscillator or a different power supply than the logic circuitry.

CONCLUSION

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation data. The term "information" may in addition to any form of digital information also include other forms of representing information. The term "entity" or "unit" may in embodiments include any device, apparatus circuits, hardware, software, firmware, chips, or other semiconductors as well as logical units or physical implementations of protocol layers etc. Furthermore the terms "coupled" or "connected" may be interpreted in a broad sense not only covering direct but also indirect coupling.

It is further to be noted that methods disclosed in the specification or in the claims may be implemented by a device having means for performing each of the respective steps of these methods.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. A device, comprising:
a transistor coupled to a bus line external to the device and to logic circuitry internal to the device, the transistor being configured to change a logic state of the bus line from a first logic state to a second logic state in response to an assertion of a control signal by the logic circuitry; and
watchdog circuitry internal to the device, the watchdog circuitry being configured to provide an overtime signal to the logic circuitry when the control signal remains asserted at the same logic state in excess of a threshold timeout period.

2. The device of claim 1, wherein the transistor is coupled to the bus line in an open drain configuration or a push-pull configuration.

3. The device of claim 1, wherein the bus line is a clock line that is connected to the device and to a second device.

4. The device of claim 3, wherein the clock line is used in accordance with an I2C communication protocol to enable the device and the second device to communicate with one another.

5. The device of claim 1, wherein the overtime signal provided by the watchdog circuitry causes one or more portions of the device to reset.

6. The device of claim 5, wherein upon the one or more portions of the device being reset, the control signal changes to a logic state that is different than the same logic state at which the control signal remained asserted in excess of the threshold timeout period.

7. The device of claim 1, wherein the watchdog circuitry is configured to initiate a timer based on detecting a change in the logic state of the control signal.

8. The device of claim 1, wherein the watchdog circuitry is configured to operate using at least one of a different oscillator or a different power supply than the logic circuitry.

9. The device of claim 1, wherein the transistor, the watchdog circuitry, and the logic circuitry are implemented on a same semiconductor chip.

10. The device of claim 1, wherein the transistor receives the control signal from the logic circuitry via a control line, and
wherein the watchdog circuitry is connected to the control line via a monitoring line.

11. A system, comprising:
a first device configured to selectively drive a bus line; and
a second device coupled to the first device via the bus line, the second device being configured to selectively drive the bus line and including:
a transistor coupled to the bus line and to logic circuitry internal to the second device, the transistor being configured to change a logic state of the bus line from a first logic state to a second logic state in response to an assertion of a control signal by the logic circuitry indicating that the second device is to drive the bus line; and
watchdog circuitry internal to the second device, the watchdog circuitry being configured to monitor a logic state of the control signal, and to provide an overtime signal to the logic circuitry when the control signal remains asserted at the same logic state in excess of a threshold timeout period.

12. The system of claim 11, wherein the first device is a master device, and
wherein the second device is a slave device.

13. The system of claim 12, wherein the control signal is one of (i) an interrupt signal that signals an event to the master device, or (ii) a clock stretching signal that prevents the master device from communicating with the slave device in excess of a threshold communication rate.

14. A method, comprising:
changing, via a transistor, a logic state of a bus line from a first logic state to a second logic state in response to an assertion of a control signal by a logic circuitry internal to a first device, the transistor being coupled to (i) a bus line external to the first device, and (ii) the logic circuitry; and
outputting, via watchdog circuitry internal to the first device, an overtime signal when the control signal remains asserted at the same logic state in excess of a threshold timeout period.

15. The method of claim 14, further comprising:
coupling the transistor to the bus line in an open drain configuration or a push-pull configuration.

16. The method of claim 14, further comprising:
coupling the bus line to a second device as a clock line that is coupled to the first device and to the second device.

17. The method of claim 16, further comprising:
asserting, via the logic circuitry, the control signal as one of (i) an interrupt signal when the first device signals an event to the second device, or (ii) a clock stretching signal that prevents the second device from communicating with the first device in excess of a threshold communication rate.

18. The method of claim 14, wherein the overtime signal provided by the watchdog circuitry causes one or more portions of the first device to reset, thereby changing the control signal to a logic state that is different than the same logic state at which the control signal remained asserted in excess of the threshold timeout period.

19. The method of claim 14, further comprising:
based on detecting a change in the logic state of the control signal, initiating a timer via the watchdog circuitry.

20. The method of claim 14, further comprising:
coupling the watchdog circuitry to at least one of a different oscillator or a different power supply than the logic circuitry.

21. The device of claim 1, wherein the overtime signal provided by the watchdog circuitry causes the logic circuitry to unassert the control signal.

22. The device of claim 21, wherein the watchdog circuitry is configured to initiate a counter that (i) starts counting up to the threshold timeout period upon the logic circuitry asserting the control signal, and (ii) resets upon the logic circuitry unasserting the control signal.

* * * * *